US006583977B1

(12) United States Patent
Oglesbee

(10) Patent No.: US 6,583,977 B1
(45) Date of Patent: *Jun. 24, 2003

(54) ZIPPER FUSE

(75) Inventor: John Wendell Oglesbee, Watkinsville, GA (US)

(73) Assignee: Motorola, Inc., Schaumburg, IL (US)

( * ) Notice: Subject to any disclaimer, the term of this patent is extended or adjusted under 35 U.S.C. 154(b) by 329 days.

This patent is subject to a terminal disclaimer.

(21) Appl. No.: 09/691,826

(22) Filed: Oct. 19, 2000

Related U.S. Application Data

(63) Continuation-in-part of application No. 09/562,265, filed on Apr. 29, 2000.

(60) Provisional application No. 60/161,802, filed on Oct. 27, 1999.

(51) Int. Cl.[7] .................................................. H02H 5/00

(52) U.S. Cl. .......................... 361/104; 361/58; 361/103

(58) Field of Search ................................ 361/103, 104, 361/106, 58, 115

(56) References Cited

U.S. PATENT DOCUMENTS 3,828,289 A * 8/1974 Hickling ........................ 337/5
6,456,186 B1 * 9/2002 Oglesbee .................... 337/161

* cited by examiner

*Primary Examiner*—Stephen W. Jackson
(74) *Attorney, Agent, or Firm*—Philip H. Burrus, IV

(57) ABSTRACT

This invention includes a current limiting circuit comprised of an array of switch-fuse pairs. Switches are coupled in series with fuses to form fuse-switch pairs. The fuse switch pairs are coupled in parallel forming an equivalent fuse. A current censing circuit senses the current flowing in the equivalent fuse. When the current exceeds a predetermined threshold, the current sense circuit actuates a control circuit that clears the fuses by opening all the transistors save one. This forces the entire current through a single fuse, causing it to clear. Each fuse is cleared in similar fashion in much the same way that a zipper is opened one tooth at a time. In other words, under normal conditions, all switches are on and each fuse carries $T_a/n$ amps, where $T_a$ is the current rating of the fuse and n is the number of fuses. If all but one transistor is turned off, then $T_a$ amps would flow through a single fuse. If the fuse were rated for $2T_a/n$, the fuse would clear.

10 Claims, 1 Drawing Sheet

ZIPPER FUSE

CROSS-REFERENCE TO RELATED APPLICATIONS

This application is a continuation-in-part of U.S. patent application Ser. No. 09/562,265, filed Apr. 29, 2000, the subject matter of which is incorporated herein by reference.

To the extent that any matter contained herein is not already disclosed in the above-identified parent application, this application claims priority from U.S. Provisional Application Ser. No. 60/161,802, filed Oct. 27, 1999, the disclosures of which, including all attached documents and appendices, are incorporated by reference in their entirety for all purposes.

TECHNICAL FIELD

This invention relates generally to current limiting circuits, and more particularly to current limiting circuits sensing a condition, like electrical current, to clear a fuse.

BACKGROUND

Many electrical circuits currently employ fuses as over-current protection devices. For example, if you accidentally drop a hair dryer into a sink full of water, the water causes a large amount of current to flow. To protect people from shock, a fuse in the hair dryer might clear, thereby "opening" the circuit. When the circuit is open, no current will flow. Likewise, many electronic devices use fuses to protect sensitive electronic components from damage. For example, cellular telephones sometimes use fuses to prevent damage to a sensitive microprocessor.

The problem with fuses in electronic devices is that they are not very accurate. When a fuse is rated at 1 Amp, it will generally clear after a 1 Amp current passes through it for a specified time. As fuses are manufactured en masse, however, there is variability in the manufacturing process. Thus, a 1 A fuse could be 1.1 A, or it might be 0.9 A, etc. Sometimes the tolerances on fuses can run as high as plus or minus twenty percent! If your expensive microprocessor needs 0.9 A to operate, yet can be damaged at 1.1 A, you have a problem in that the fuse you select may allow your processor to be damaged.

There is thus a need for a more accurate current limiting means.

DETAILED DESCRIPTION OF THE INVENTION

Figure 1:
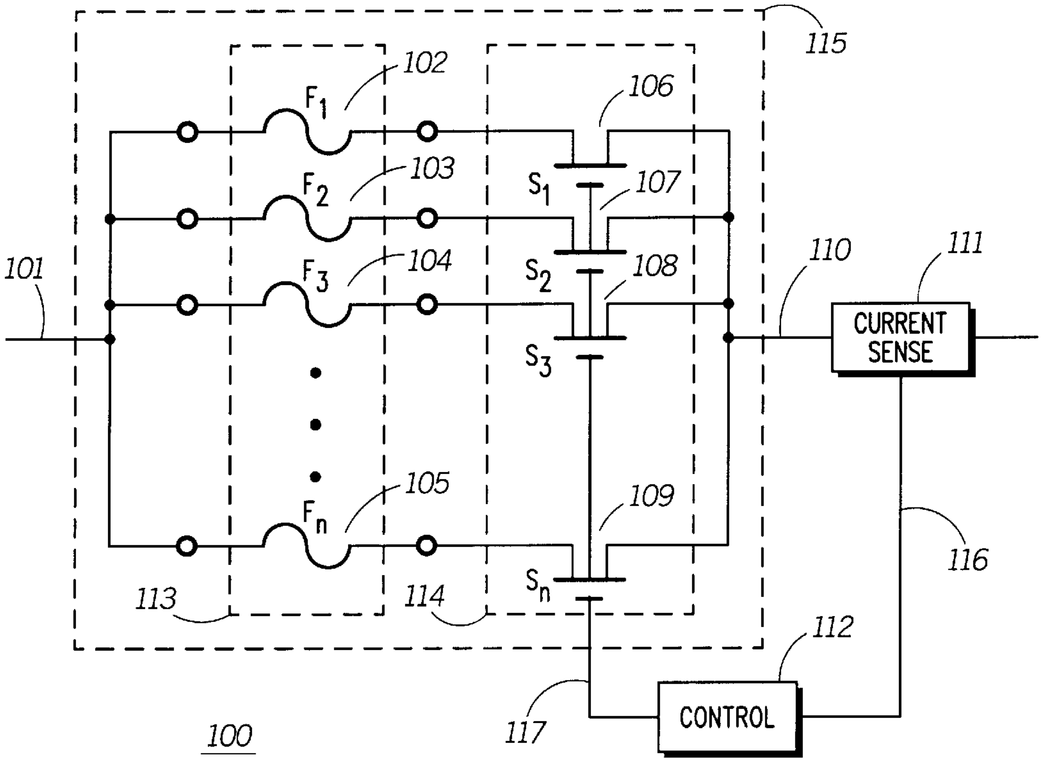
FIG. 1. is a schematic diagram of a preferred embodiment current limiting circuit in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides an accurate means of protecting a circuit from over-current conditions. As stated above, fuses can exhibit wide tolerances about their rated value. These tolerances can be in excess of 20%. While laser trimmed fuses are available at tight tolerances, these fuses are quite expensive. In the realm of consumer electronics, the market will not tolerate a fuse that comprises 25% of the total cost of the product. This invention utilizes an array of switches, coupled with an accurate current sensing circuit to allow the designer to build an extremely accurate "fuse equivalent" from an array of inexpensive, inaccurate fuses.

Referring now to FIG. 1, a preferred embodiment is illustrated therein. The protection circuit 100 comprises an array of switches 114. For exemplary purposes, transistors 106–109 will be used as switches. Other appropriate switching devices may include relays, mechanical switches, vacuum tubes and the like. The array can be any combination of more than one switch. FIG. 1 illustrates N switches represented as N transistors.

Coupled to the transistors 106–109 are an equivalent number of fuses 102–105. The fuses 102–105 have been numbered in like fashion for the purposes of discussion. The fuses 102–105 and the transistors 106–109 are bounded on each side by a common node. A first node 101 couples the array of fuses 113 together, while a second node 110 couples the transistors 106–109 together.

This structure of bounded array of fuses 115 is coupled in series with a current sensing circuit 111. As the same current flows through components in series, the current sensing circuit 111 is able to measure the current flowing in the bounded array 115. The output of the current sensing circuit 116 is coupled to a control circuit. When the current exceeds a predetermined threshold, the output of the current sensing circuit polls the control circuit 112 that activates a plurality of control lines 117 coupled to the array of transistors 114. Each control line is coupled to a different transistor.

The circuit 100 creates an "equivalent fuse". The rating of the fuse may be a predetermined threshold set below the sum of the ratings of the fuses in the array 113, or it may be the sum of the ratings of the fuses in the array 113 itself. During normal operation, the transistors are all in the fully saturated or "on" mode. Thus, if all the fuses are similarly rated, they tend to conduct current in relatively equal proportion.

The operation of the circuit is best explained by example. For discussion purposes, assume that the array of fuses consists of three fuses, F1, F2, and F3. Assume the fuses are 1 A fuses with 20% tolerances, and the exact values are 0.95 A for F1, 1.05 A for F2, and 1.15 A for F3. The sum rating of the fuses in parallel is 3.15 A.

Now assume that we want to build a 2.75 A fuse. We first set a predetermined threshold in the current sense circuit at 2.75 A. When the circuit is conducting current less than this amount, the currents generally divide themselves equally between the three fuses according to Kirchoff's Current Law. Thus, each fuse would be conducting roughly ⅓ of the total current. All is well.

Now, when a current exceeds the threshold, things begin to happen. For the purposes of this discussion, imagine that a 3 A current suddenly appears. This level is above our equivalent fuse rating of 2.75 A, but is below the parallel sum of 3.15 A. Consequently, there may not be enough current to clear the parallel fuses with all the transistors turned on.

The circuit deals with this, however, with the current sense circuit. When the current sense circuit senses current in excess of 2.75 A, it polls the control circuit. The control circuit then opens all the transistors except one. For example, as soon as the 3 A current is sensed, the control circuit may open F2 and F3, while leaving F1 in conduction.

This forces the entire 3 A through F1, which is rated at 0.95 A. As 3 A is much larger than 0.95 A, the fuse clears quickly.

The control circuit then turns on F2 while leaving F3 open. The 3 A current is then forced through F2, causing the 1.05 A fuse to clear. Finally, the control circuit closes F3 forcing all the current through F3. As 3 A is greater than 1.15 A, the fuse clears.

As shown, the equivalent fuse has cleared each parallel fuse one at a time much in the same way a zipper disengages itself one tooth at a time. Just as each tooth in a zipper is weak by itself, each fuse in the circuit has a course tolerance and offers little protection. However, when the fuses are paralleled with each other, they become highly effective in the same way that a zipper is highly effective at closing pants when all the teeth are coupled in parallel.

The circuit offers numerous advantages over simple single fuse circuits. First, as already stated, fuses with course tolerances are substantially cheaper than laser-trimmed, highly accurate fuses. Thus, even including the transistors, the designer may be able to construct a 0.01% equivalent fuse for less cost than a comparable 1% laser trimmed fuse.

Next, this circuit allows fuses to be integrated into silicon integrated circuits (ICs). Metal traces and resistive can be constructed on silicon. Additionally, other techniques for manufacturing fuses on silicon, including the use of metals, wire-bonding and poly-silicon materials is well know in the art. When excessive currents flow through these traces or silicon fuses, they clear much in the same way a fuse does: by heating due to $I^2R$ losses and eventually breaking down or vaporizing the solid material until the conducting path no longer exists.

While building fuses on silicon is known, the thermal characteristics of such fuses is very hard to predict due to the nature of the manufacturing process. If the designer tries to manufacture two identical traces on a piece of silicon, their fusing characteristics may vary as much as 50%! This circuit allows the designer to use these traces to construct a highly accurate fuse on silicon by coupling fuses in parallel and adding a current sense circuit. Thus, an external fuse may not even be necessary. This is advantageous as the cost of an external fuse can be more than 1000 times higher than the cost of an on-silicon fuse.

A third reason is that high current rating fuses are very expensive. For example, while 1 A fuses in surface mount packages for integrated electronics are commonly available, 5 or more A fuses are impossible to find. This circuit allows the designer to construct an equivalent fuse of virtually any size by combining smaller fuses in parallel. Thus, a highly accurate 5, 10 or even 20 A fuse may be constructed with smaller fuses.

Figure 2:
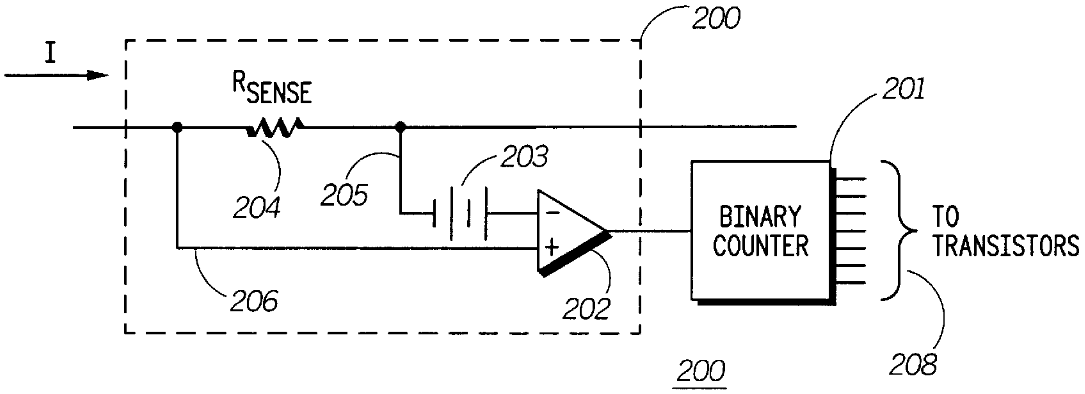
FIG. 2 is an exemplary current sense and control circuit in accordance with the invention.

Referring now to FIG. 2, illustrated therein is an exemplary embodiment of a current sense circuit 200 and a control circuit 201. The current sense circuit 200 comprises a comparator 202, a resistive element 204 and an offset voltage 203. As current flows through the resistive element 204, a voltage is created. When the voltage across the current sensing element 204 exceeds the offset voltage 203, the output of the comparator 207 switches from high to low thereby polling the control circuit 201. Clearly, this is an exemplary embodiment only. Numerous other current sensing techniques, including analog to digital (A/D) converters, magnetic field sensors, and the like would also suffice.

The control circuit 201 may be as simple as a binary counter that is actuated by the polling of the comparator 202. If the various bit outputs are coupled to the transistor array, as the counter increases its count, each transistor is eventually closed while the others are opened. Numerous other techniques could be employed as control circuits, including microprocessors, discrete logic and programmable gate arrays.

While the invention has been described as being directed towards a circuit that is responsive to excessive current, the circuit is not so limited. There are numerous other conditions in consumer and industrial electronics that can cause damage to systems. For example, if a person drops a hair dryer into a sink of water, hazardous conditions may result. This invention can be easily modified to respond to stimuli other than excessive current.

Conditional sensors of various types are well known in the art. These include, temperature sensors, humidity sensors, smoke sensors, light sensors, audio sensors, radio-frequency ("RF") sensors, water level sensors, weight sensors, motion sensors, waveform analysis sensors, pressure sensors, continuity sensors, voltage sensors, gas sensors and chemical element sensors, just to name a few. It is contemplated that this invention may easily be modified to sequentially clear a plurality of fuses based upon the control circuit receiving an input for any one of these sensors. For example, if a zipper fuse coupled with a moisture sensor were integrated into the hair dryer, when the hair dryer came into contact with water the fuses would all clear. Modifications of this type will be readily apparent to those skilled in the art.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the current sense circuit has been described as having a single comparator sensing current in a single direction, it is clear that two comparators could be paralleled in opposite direction to provide bi-directional current sensing.

What is claimed is:

1. A current limiting circuit comprising:

a. at least two switches;

b. at least two fuses coupled to the at least two switches;

c. a sensing circuit; and d. a control circuit coupled to the at least two switches; wherein the at least two switches are coupled in series with the at least two fuses such that a first switch is in series with a first fuse, the combination being coupled in parallel with and a second switch in series with a second fuse.

2. The circuit of claim 1, wherein the at least one switch is selected from the group consisting of transistors, mechanical switches, vacuum tubes and relays.

3. The circuit of claim 2, wherein the sensing circuit senses a change related to a condition selected from the group consisting of temperature, humidity, smoke, light, audio, RF, water level, weight, motion, waveform analysis, pressure, continuity, liquid current, electrical current, voltage, and chemical element presence.

4. The circuit of claim 3, wherein the sensor senses electrical current.

5. The circuit of claim 3, wherein the sensing circuit polls the control circuit when the current exceeds a predetermined threshold.

6. The circuit of claim 5, wherein when the control circuit clears the at least two switches one at a time in the following manner:

a. first, the switch is closed while all other switches are open;

b. next, the second switch is closed while all other switches are open.

7. The circuit of claim 6 wherein the current sensing circuit comprises:

a. a comparator having two inputs;

b. a resistive element, wherein each side of the resistive element is coupled to each of the two comparator inputs; and c. an offset voltage coupled in series between one side of the resistive element and one of the comparator inputs.

8. A method of limiting current, the method comprising the steps of:

a. coupling a fuse in series with a switch to form a fuse-switch pair;

b. coupling at least two fuse-switch pairs in parallel;

c. opening all switches;

d. closing one switch at a time while the other switches remain open.

9. The method of claim 6, wherein the switch actuation is in response to the current flowing in the at least two fuse-switch pairs in parallel exceeding a predetermined threshold.

10. The method of claim 7, wherein the switches are transistors.

* * * * *

UNITED STATES PATENT AND TRADEMARK OFFICE

CERTIFICATE OF CORRECTION

PATENT NO. : 6,583,977 B1
APPLICATION NO. : 09/691826
DATED : June 24, 2003
INVENTOR(S) : Oglesbee It is certified that error appears in the above-identified patent and that said Letters Patent is hereby corrected as shown below:

Title page, item [57] In the Abstract, at line 5, the word “censing” should be --- sensing ---.

Signed and Sealed this

Twenty-ninth Day of August, 2006

JON W. DUDAS
*Director of the United States Patent and Trademark Office*